United States Patent
Gubbins

(10) Patent No.: US 8,400,891 B2
(45) Date of Patent: Mar. 19, 2013

(54) DELAY LINE ON A MOVABLE SUBSTRATE ACCESSING DATA STORAGE MEDIA

(75) Inventor: Mark Anthony Gubbins, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 370 days.

(21) Appl. No.: 12/492,580

(22) Filed: Jun. 26, 2009

(65) Prior Publication Data

US 2010/0329091 A1 Dec. 30, 2010

(51) Int. Cl.
*G11B 20/10* (2006.01)

(52) U.S. Cl. .............. 369/47.28; 369/44.19; 369/53.1; 360/51; 360/55; 360/75; 360/230; 360/244.1; 360/250; 360/290

(58) Field of Classification Search .......... 369/47.28, 369/44.19, 53.1; 360/51, 55, 75, 244.1, 230, 360/250, 290
See application file for complete search history.

(56) References Cited

U.S. PATENT DOCUMENTS

| | | | |
|---|---|---|---|
| 5,153,784 A | 10/1992 | Kitamura | |
| 5,521,568 A * | 5/1996 | Wu et al. | 333/140 |
| 6,084,739 A | 7/2000 | Assouad | 360/77.08 |
| 6,134,084 A * | 10/2000 | Ohwe et al. | 360/244.1 |
| 6,266,213 B1 * | 7/2001 | Hiraoka | 360/244.1 |
| 6,498,702 B1 * | 12/2002 | Shimizu et al. | 360/244.1 |
| 6,738,207 B1 | 5/2004 | Belser et al. | 360/31 |
| 6,812,760 B1 | 11/2004 | Kim et al. | 327/158 |
| 7,148,842 B1 | 12/2006 | Crowne et al. | 342/175 |
| 7,450,342 B2 * | 11/2008 | White et al. | 360/234.5 |
| 8,098,455 B2 * | 1/2012 | Ionescu et al. | 360/110 |
| 2002/0018414 A1 * | 2/2002 | Asano | 369/47.28 |
| 2002/0118479 A1 * | 8/2002 | Yoshizawa et al. | 360/67 |
| 2002/0135970 A1 | 9/2002 | Klee et al. | 361/302 |
| 2003/0026182 A1 | 2/2003 | Fischer et al. | 369/47.28 |
| 2003/0101410 A1 | 5/2003 | Betti et al. | 714/794 |
| 2004/0202066 A1 * | 10/2004 | Yoshizawa et al. | 369/44.19 |
| 2005/0068652 A1 | 3/2005 | Tomimoto | 360/48 |
| 2007/0096848 A1 | 5/2007 | Larson | 333/161 |
| 2007/0159271 A1 | 7/2007 | Kuylenstierna | 333/161 |
| 2008/0072124 A1 | 3/2008 | Chiou | 714/790 |
| 2010/0188946 A1 * | 7/2010 | Ohwe | 369/53.1 |

* cited by examiner

*Primary Examiner* — Wayne Young
*Assistant Examiner* — Linh N Hoffner
(74) *Attorney, Agent, or Firm* — Alan G. Rego; Westman, Champlin & Kelly, P.A.

(57) ABSTRACT

An apparatus includes a read/write head disposed on a slider, a control circuit disposed on the slider, and an adjustable delay line disposed on the slider. The adjustable delay line delays transmission of aligned write data to the read/write head by an adjustable delay. The adjustable delay is controlled by the control circuit a function of read synchronization data provided by the read/write head.

21 Claims, 14 Drawing Sheets

DELAY LINE ON A MOVABLE SUBSTRATE ACCESSING DATA STORAGE MEDIA

BACKGROUND

The present disclosure relates to data storage devices. In writing data on data storage media, each data bit is written at a precise location in order to ensure that errors do not occur in the data writing or recovery processes. There is a desire to synchronize a geometric alignment of a media location and a write head with the time of arrival of a write pulse at the write head. However, there are problems with achieving such close synchronization. Both read and write signals may be conducted to a read/write head via flexible circuitry. The flexible circuitry moves as the read/write head moves across the media, and the time delays of the read and write signals vary with the motion. Temperature changes and aging of components can introduce other variable time delays. The variable time delays introduce synchronization errors in the picosecond range that increase a bit error rate.

Aspects disclosed provide solutions to these and other problems, and offer other advantages over the prior art.

SUMMARY

An apparatus is disclosed. The apparatus comprises a data access transducer. The data access transducer is disposed on a movable substrate.

The apparatus comprises a control circuit. The control circuit is disposed on the movable substrate.

The apparatus comprises an adjustable delay line. The adjustable delay line is disposed on the movable substrate. The adjustable delay line delays transmission of aligned write data to the data access transducer by an adjustable delay. The adjustable delay is controlled by the control circuit a function of read synchronization data provided by the data access transducer.

Other features and benefits that characterize disclosed aspects will be apparent upon reading the following detailed description and review of the associated drawings.

DETAILED DESCRIPTION

Figure 1:
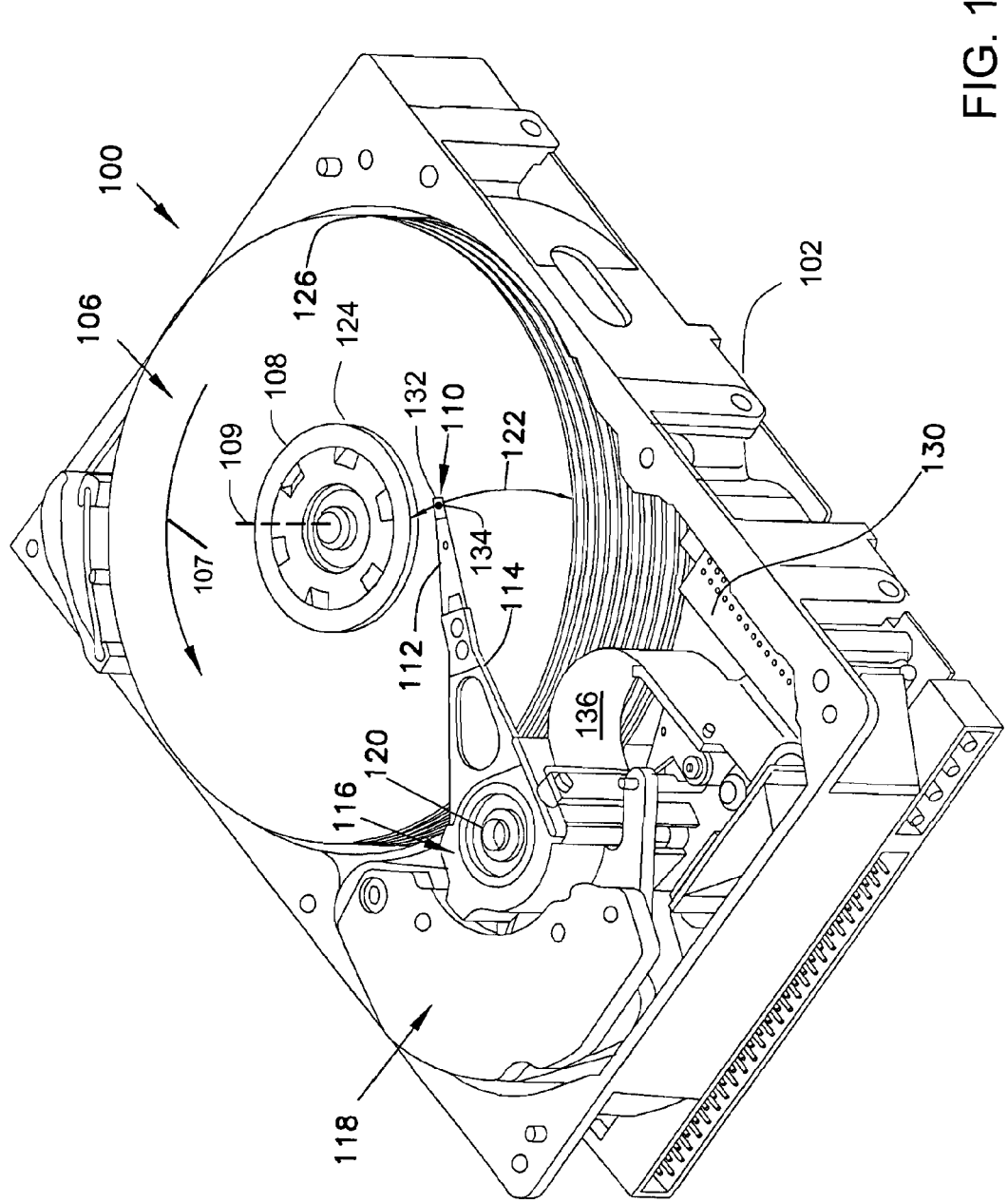
FIG. 1 illustrates an oblique view of a disc drive that includes an adjustable delay line and a control circuit disposed on a slider.

In the aspects described below, an adjustable delay line and a delay control circuit are disposed on a movable substrate along with a data access transducer. Early write data is provided via one or more flexible circuits to an input of the delay line. The delay line provides an aligned write data output that couples to a data writing transducer that is a portion of the data access transducer. The delay control circuit senses a read sync signal from a data reading transducer that is a part of the data access transducer. The delay control circuit also senses the aligned write data output from the delay line. The delay control circuit controls the adjustable delay to align write pulses with the alignment of media locations with the data writing transducer. The variable delays of the flexible circuits are corrected at the output of the delay line, effectively cancelling timing noise and providing precise alignment for writing data to precise locations on the data storage media. Timing control loop connections between the delay control circuit, the data access transducer and the adjustable delay line are made on the moving substrate, and the timing control loop connections are free of delay errors due to motion, temperature change and aging of the flexible circuits.

According to one aspect, the data storage media comprises bit patterned magnetic media and the data access transducer on the moving substrate comprises a read/write head on a slider.

Many current advances in magnetic recording head technology are driven by a desire for increased information areal density in a hard drive. However reliability, data rate and repeatability are also important factors in hard drive performance.

Bit patterned media involves the patterning of individual magnetic data bits in the magnetic storage layer. Individual magnetic data bits are separated from one another by a nonmagnetic matrix. This means that the volume of each magnetic unit is larger than a grain, and the media volume-anisotropy stability metric is larger. The ability of the disk to hold information over time improves and the signal to noise ratio of the data write-read processes also improves.

However, each patterned data bit has to be precisely written, in order to ensure that errors do not occur in the data write and recovery processes. Each patterned bit must be highly synchronized with each data bit, otherwise data insertion will occur on an incorrect bit, or a bit will be skipped for data writing. Therefore, the writing process on each physical bit has to be precisely aligned with the incoming data.

To synchronize the writing process, data is read after being written using a magnetic reader or other sensor over the trailing edge of the write pole. Otherwise, data may be read before being overwritten using the standard data reader to detect bit positions. Data from these readers can be used to synchronize the writing process. The phase relationship between the writing process and the physical bits is easier to maintain if the bit detection and bit writing are close together in time.

Accurately aligning the write signal with the bit position is critical for data recording on bit patterned media. Present recording systems require the data detected by the recording head to be sent to processing electronics via long flexible electrical lines and write current used to write data is also sent to the head via flexible electrical lines. The time required and errors involved in sending data to the processing electronics and in sending data to the writer are large compared to the phase coherence time of the bit-patterned writing.

The ability to adjust the signal to the writer, on a picosecond time scale, facilitates synchronized writing for bit-patterned recording. Implementing this timing adjustment close to the writer, reduces external interference to the write signal, resulting in a decrease in noise and error sources.

The presently disclosed delay line solution enables write synchronization through controllable timing adjustment of write pulses from write driver to a data writing transducer, facility to adjust writer timing on the movable substrate, picosecond time resolution for synchronization of high areal density bit patterned recording, and efficient signal transfer through low loss ferroelectric materials in the adjustable delay line.

A delay is implemented by routing the writer pulses through a delay line, sandwiched between two ferroelectric layers and two electrodes. Applying a voltage to the ferroelectric layers changes the permittivity of the layers. This, in turn, influences propagation delay in the conducting lines, allowing timing control of the write signal that is adjusted on the slider itself, without control signals passing through flexible circuits.

Ferroelectric thin films can have very high relative permittivities and the permittivity can be varied on application of a potential bias. Ferroelectric materials have a spontaneous electric polarization. The direction of the polarization can be switched by application of an electric field. While relative permittivities of up to 10,000 are possible for materials like SrTiO or BaSrTiO in bulk form, the achievable relative permittivity drops to approximately 300-1000 in thin film form. This value can typically be tuned to half or one third of this value, upon application of an electric field. In one example, BaSrTiO shows a change in permittivity from 1200 to 550 as a bias voltage is varied from 0 to 200V across a film thickness of 10 micrometers. This is equivalent to the electric field resulting from application of 20V across a 1 micrometer film. Properties of ferroelectric films are sensitive to the growth substrate, growth temperature, interface effects and stoichiometry. Thin film ferroelectrics are used in varactors, microwave phase shifters and microwave tunable filters. Response times can be in the sub 100 picosecond (ps) range.

FIG. 1 illustrates an oblique view of a disc drive 100 in which the presently disclosed adjustable delay line and delay control circuit are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction 107 about a central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. An adjustable delay line 132 and a delay control circuit 134 are disposed on each slider 110. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track of bit patterned media along an arcuate path 122 between a disc inner diameter 124 and a disc outer diameter 126. As actuator 116 moves the track accessing arm 114, a flexible circuit 136 flexes and changes its shape. As the flexible circuit 136 flexes, delays of signals carried by the flexible circuit 136 change in the picosecond range. Voice coil motor 118 is driven by servo electronics 130 based on signals generated by heads 110 and a host computer (not shown in FIG. 1).

Figure 2A:
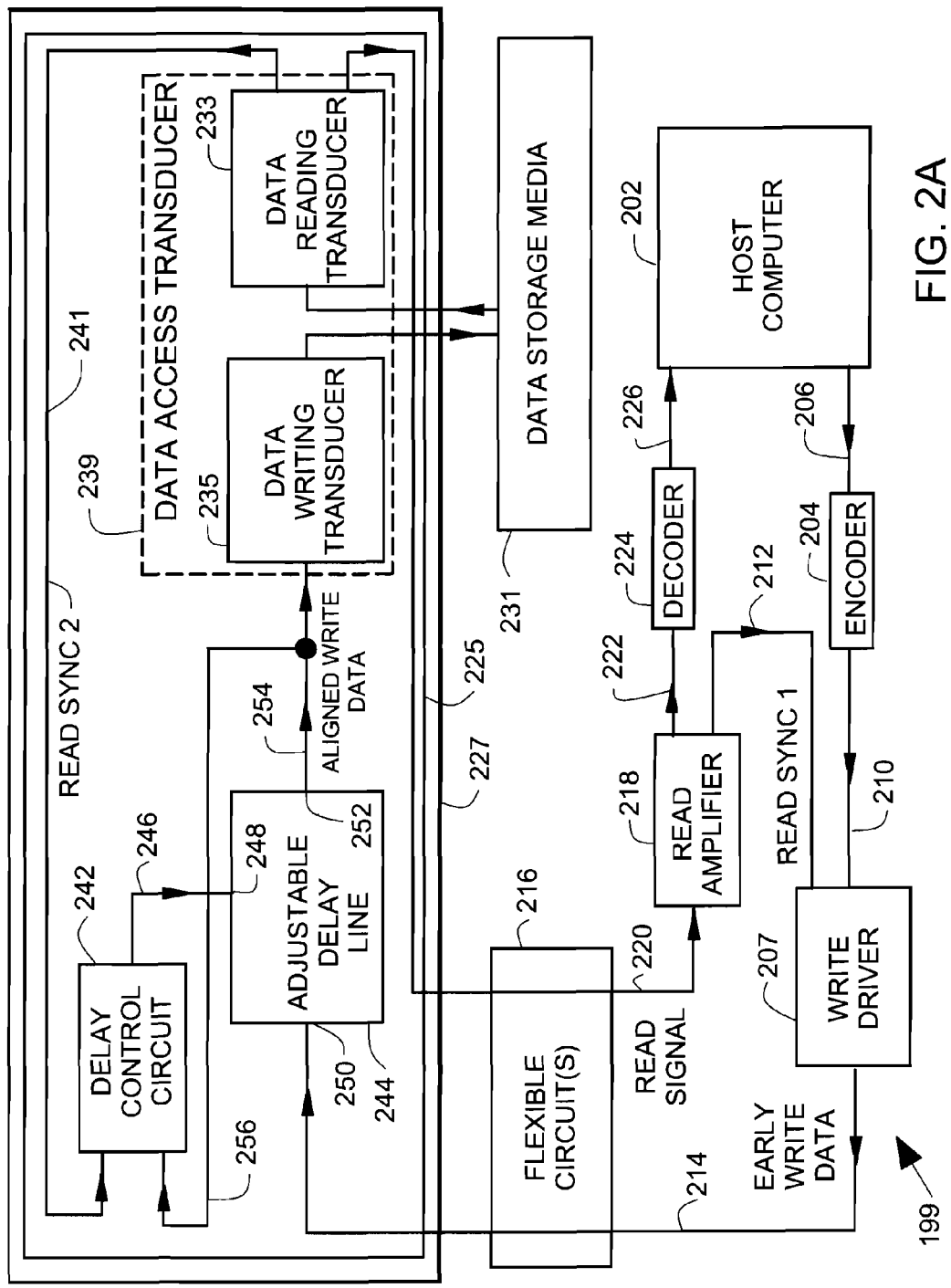
FIG. 2A illustrates a block diagram of a movable substrate in a data storage device that is coupled to a host computer.

FIG. 2A illustrates a block diagram of a data storage device 199 that includes a movable substrate 227 that is coupled to a host computer 202 through flexible circuits 216 and read/write electronic circuits. The data storage device 199 comprises an encoder 204 that receives data from the host computer on a line 206. The encoder 204 provides encoded data along a line 210 to a write driver 207 in the data storage device 199. The write driver 207 receives a synchronization output (READ SYNC 1) on line 212. The write driver 207 provides write pulses (EARLY WRITE DATA) on line 214. The write pulses (EARLY WRITE DATA) on line 214 couple through circuit conductor traces on the one or more flexible circuits 216 in the data storage device 200.

The data storage device 200 comprises a read amplifier 218. The read amplifier 218 receives a low level read signal on a line 220. The low level read signal on line 220 couples through circuit conductor traces on the one or more flexible circuits 216. The read amplifier 218 provides an amplified read output on line 222 to a decoder 224 in the data storage device 199. The decoder 224 provides decoded data on line 226 to the host computer 202. The read amplifier 218 provides the synchronization output (READ SYNC 1) on the line 212.

The data storage device 199 comprises the movable substrate 227 (such as sliders 110 in FIG. 1, for example) that flies over data storage media 231 (such as bit patterned media in disc pack 106 in FIG. 1, magnetic discs, magnetic tunnel junction memory arrays, resistive RAM, phase change RAM, spin torque transfer RAM and other known types of mechanically scanned data storage arrays). A data reading transducer 233, a data writing transducer 235, a delay control circuit 242 and an adjustable delay line 244, taken together, comprise an apparatus 225 disposed on a movable substrate 227. The data reading transducer 233 is disposed on the movable substrate 227 and reads data from the data storage media 231 as the data storage media 231 moves past the data reading transducer 233. The data reading transducer 233 can comprise one or more magnetic readers or other read sensors. The data writing transducer 235 is disposed on the movable substrate 227 and writes data on the data storage media 231 as the data storage media 231 moves past the data writing transducer 235.

According to one aspect, the data reading transducer 233 and the data writing transducer 235 are electrical contact probes that transduce electrical signals on a scanned storage media surface. According to another aspect, the data reading transducer 233 and the data writing transducer 235 are the same electrical contact probe, and the electrical contact probe is multiplexed between reading and writing tasks. The data reading transducer 233 and the data writing transducer 235, taken together, comprise a data access transducer 239.

The read amplifier 218 derives timing of the synchronization output (READ SYNC 1) on line 212 from the low level read head signal on line 220. The low level read signal on line 220 is provided by the data reading transducer 233. The synchronization output (READ SYNC 1 on line 212) is synchronized early in time with respect to an alignment of the data writing transducer 235 with a precise location on the data storage media. The synchronization output (READ SYNC 1) on line 212 is subject to timing errors due to variations in delay as the one or more flexible circuits 216 flex during motion of an actuator (such as actuator 116 in FIG. 1).

The data reading transducer 233 provides a second synchronization output (READ SYNC 2) on line 241. The delay control circuit 242 is disposed on the movable substrate 227. The delay control circuit 242 receives the second synchronization output (READ SYNC 2) on line 241. The adjustable delay line 244 is disposed on the movable substrate 227. The delay control circuit 242 provides a delay control output on line 246 that couples to a delay time adjustment input 248 of the adjustable delay line 244. The early write data on line 214 couples to a write data input 250 of the adjustable delay line 244. At the write data input 250, the early write data is subject to timing error due to variable delays passing through the one or more flexible circuits 216. The adjustable delay line 244 has a write data output 252 that provides aligned write data on line 254 to the data writing transducer 235. The delay control circuit 242 senses the aligned write data on line 254 via sensing line 256.

In operation, the early write data on line 214 is delayed by the adjustable delay line 244 to provide aligned write data on line 254 at a time when the data writing transducer 235 is properly aligned for writing data to a precise location on the data storage media 231. The adjustable delay line 244 is described in more detail below by way of examples illustrated in FIGS. 5, 6 and 7. The delay control circuit 242 is described in more detail below by way of an example illustrated in FIG. 4.

Figure 2B:
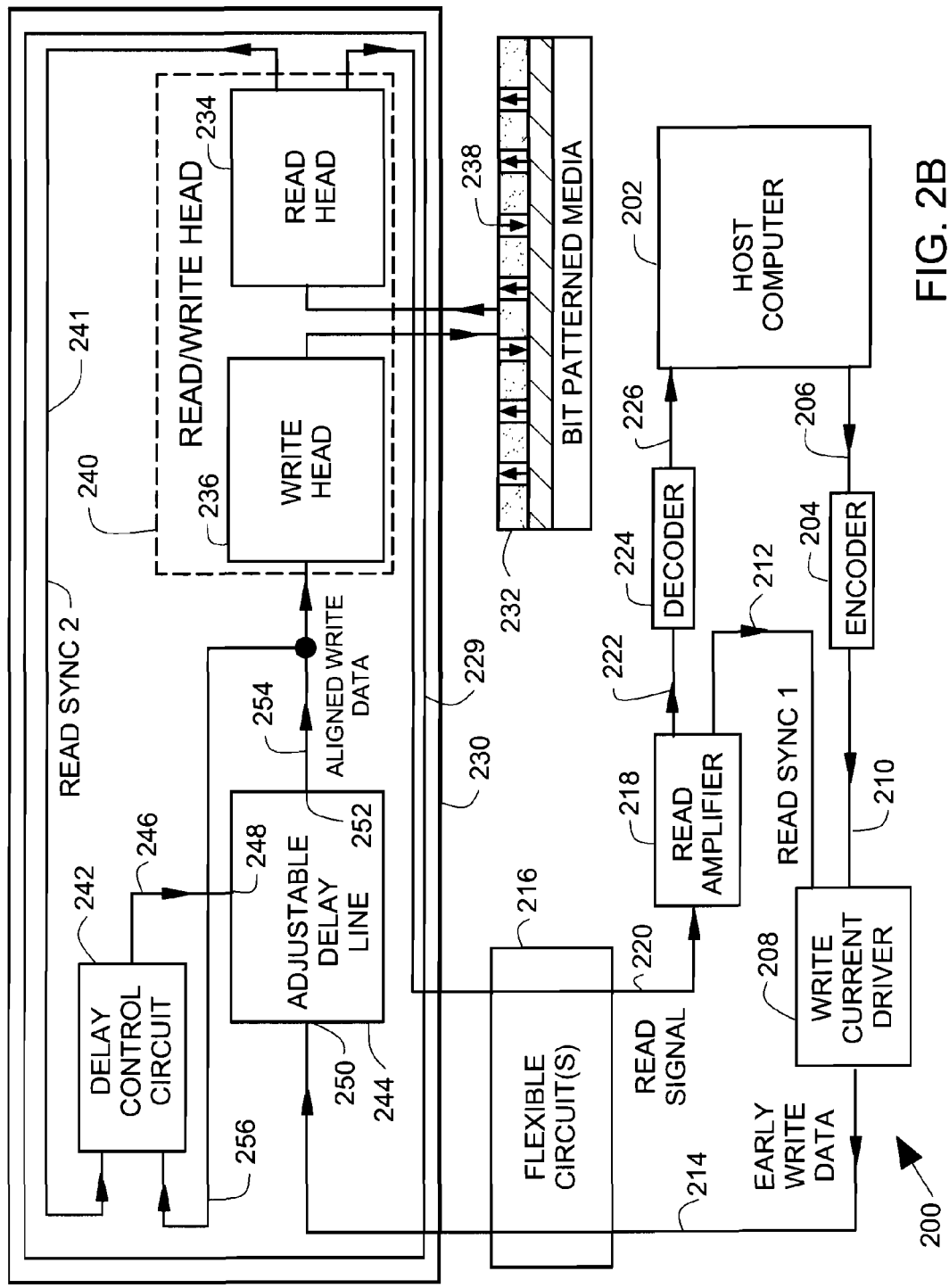
FIG. 2B illustrates a block diagram of a slider in a disc drive that is coupled to a host computer.

FIG. 2B illustrates a block diagram of a data storage device 200 that includes a movable substrate 230 that is coupled to a host computer 202. The data storage device 200 in FIG. 2B is similar to the data storage device 199 in FIG. 2A, however, the data storage device 200 in FIG. 2B illustrates an example in which the data storage media 232 comprises magnetic bit patterned media bits 238, the data writing transducer comprises a magnetic write head 236 and the data reading transducer comprises a magnetic read head 234. In the data storage device 200 in FIG. 2B, the write driver comprises a write current driver 208. In other respects, the data storage device 200 in FIG. 2B is similar to the data storage device 199 in FIG. 2A. For the sake of brevity, descriptions of reference numbers that have been described above in connection with FIG. 2A are not repeated here in connection with FIG. 2B.

In FIG. 2B, the encoder 204 provides encoded data to a write current driver 208. The write current driver 208 receives a synchronization output (READ SYNC 1) on line 212. The write current driver 208 provides write current (EARLY WRITE DATA) on line 214. The write current (EARLY WRITE DATA) on line 214 couples through circuit conductor traces on one or more flexible circuits 216 in the data storage device 200.

In FIG. 2B, the data storage device 200 comprises a read amplifier 218. The read amplifier 218 receives a low level read head signal on a line 220. The low level read signal on line 220 couples through circuit conductor traces on the one or more flexible circuits 216.

In FIG. 2B, the data storage device 200 comprises a slider 230 (such as sliders 110 in FIG. 1, for example) that flies over bit-patterned media 232 (such as bit patterned media in disc pack 106 in FIG. 1). A read head 234, a write head 236, a delay control circuit 242 and an adjustable delay line 244, taken together, comprise an apparatus 229 disposed on a slider 230. The read head 234 is disposed on the slider 230 and reads data from the bit patterned media 232 as the bit patterned media 232 moves past the read head 234. The read head 234 can comprise one or more magnetic readers or other read sensors. The write head 236 is disposed on the slider 230 and writes data on the bit patterned media 232 as the bit patterned media 232 moves past the write head 236. The read head 234 and the write head 236 are spaced apart from one another (along the axis of motion of the bit patterned media 232) by a small fixed spacing, resulting a small fixed time difference between access of a bit (such as bit 238) by the read head 234 and access of the bit by the write head 236. The read head 234 and the write head 236, taken together, comprise a read/write head 240. The small fixed time difference is on the order of a picosecond. Thus the timing of read and write signals are offset by a known fixed time interval on the order of a picosecond.

In FIG. 2B, the read amplifier 218 derives timing of the synchronization output (READ SYNC 1) on line 212 from the low level read head signal on line 220. The low level read signal on line 220 is provided by the read head 234. The synchronization output (READ SYNC 1) is synchronized early in time with respect to an alignment of the write head 236 with a bit of the bit patterned media. The read head 234 provides a second synchronization output (READ SYNC 2) on line 241.

In operation in FIG. 2B, the early write data on line 214 is delayed by the adjustable delay line 244 to provide aligned write data on line 254 at a time when the write head 236 is properly aligned for writing data to a bit of bit patterned media 232. The adjustable delay line 244 is described in more detail below by way of examples illustrated in FIGS. 5, 6 and 7. The delay control circuit 242 is described in more detail below by way of an example illustrated in FIG. 4.

Figure 3:
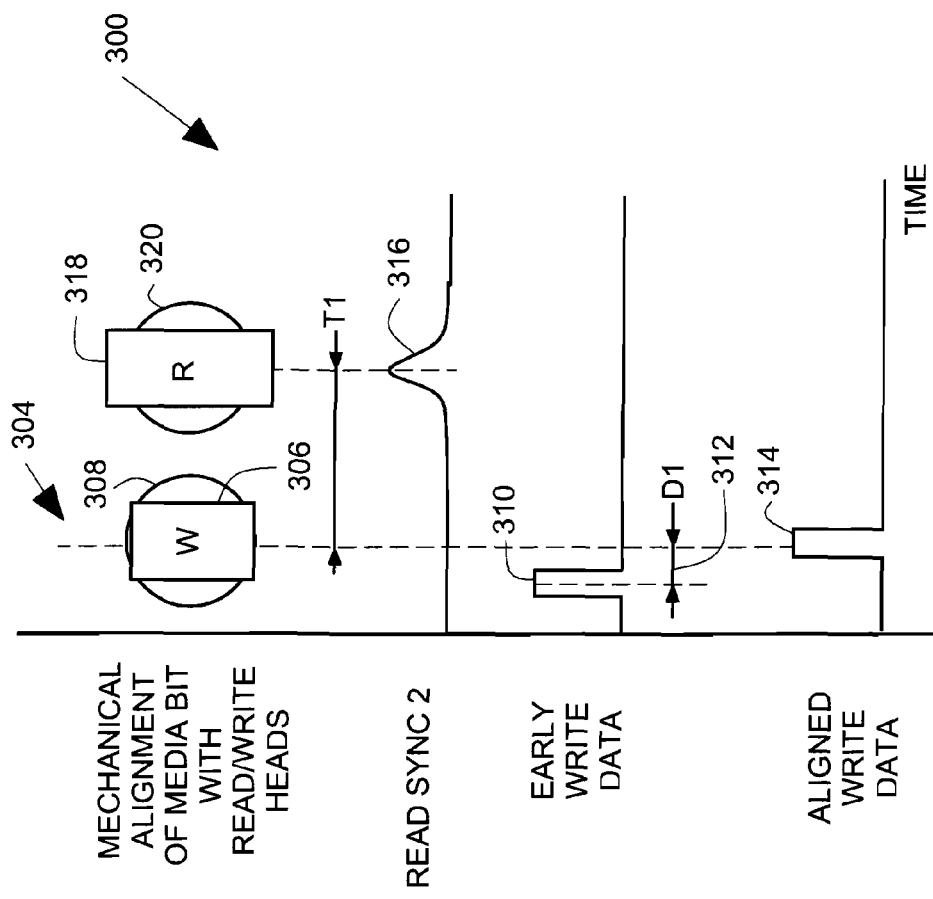
FIG. 3 is a timing diagram illustrating timing alignment of an aligned write data pulse with a mechanical alignment of a write head pole with a bit of bit patterned media.

FIG. 3 illustrates a timing diagram 300 illustrating timing alignment of an aligned write data pulse 314 (such as a pulse of aligned write data 254 in FIG. 2B) with a mechanical alignment 304 of a write head pole 306 with a bit 308 (such as bit 238 in FIG. 2B) of bit patterned media (such as bit patterned media 232 in FIG. 2B). An early write data pulse 310 is provided to an input of an adjustable delay line (such as adjustable delay line 244 in FIG. 2B). The adjustable delay line delays the early write data pulse 310 by a delay D1 at 312, and the adjustable delay line provides the aligned write data pulse 314. The delay D1 at 312 is adjusted by a delay control circuit (such as delay control circuit 242 in FIG. 2B) so that the aligned write data pulse 314 is present at the same instant that the write head 306 passes directly over the bit 308 as illustrated.

A read sync 2 pulse 316 is produced by a read head 318 (such as read head 234 in FIG. 2B) when the read head 318 passes directly over a bit 320 of bit patterned media. It is understood that the pattern illustrated in timing diagram 300 repeats each time a read/write head passes over a bit of bit patterned media. The time delay D1 is adjusted slowly as an average as the read/write head passes over multiple bits of bit patterned media. Operation of the delay control circuit 242 is described in more detail below in connection with FIG. 4.

While FIG. 3 illustrates a write head 308 passing over a bit before a read head 318 passes over that same bit, it will be understood that a read head can pass over a bit before a write head if the read and write heads are stacked in a different order on a slider. Control of the delay D1 at 312 is described in more detail below by way of an example delay control circuit in FIG. 4.

Figure 4:
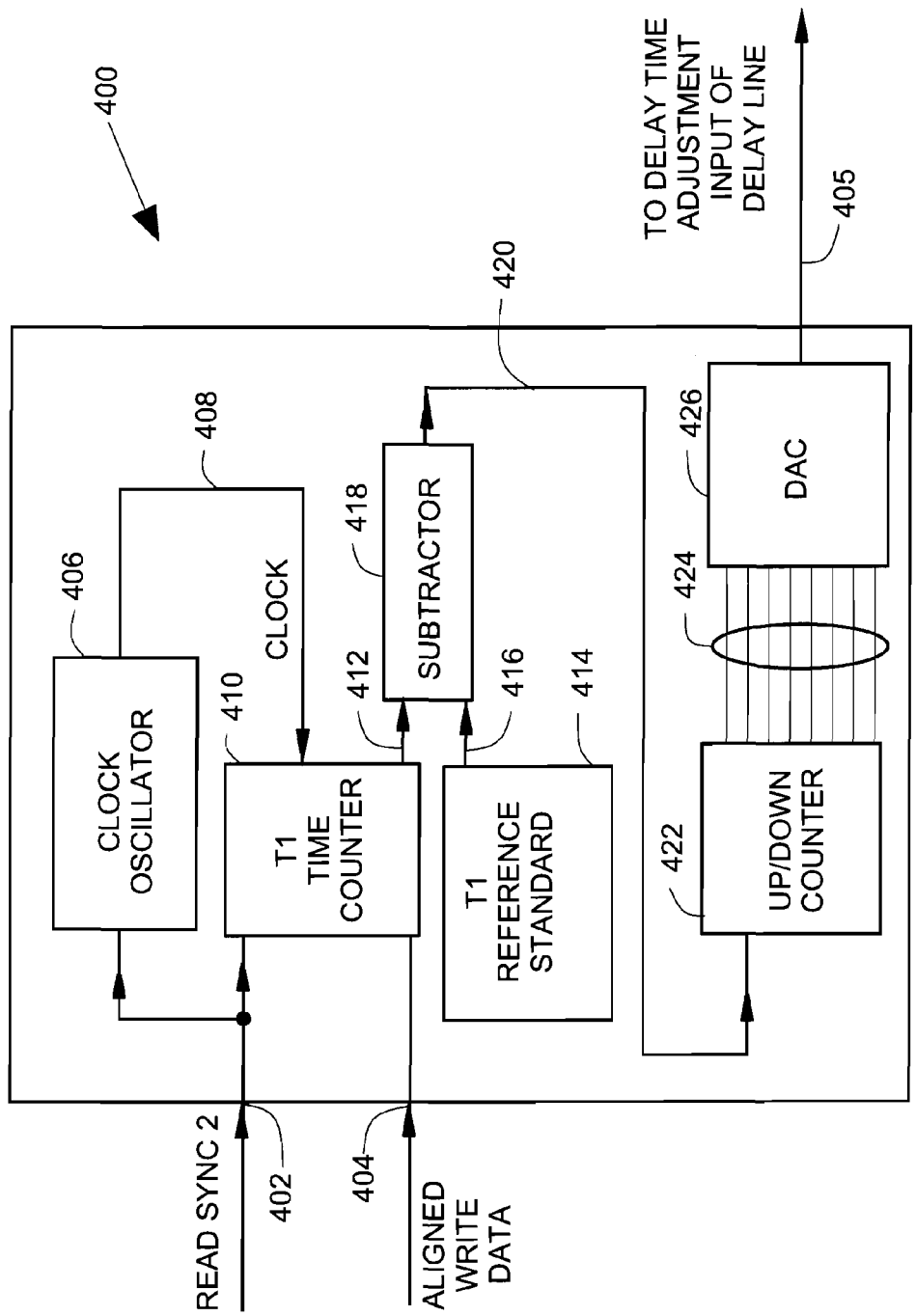
FIG. 4 illustrates a block diagram of an exemplary delay control circuit.

FIG. 4 illustrates a block diagram of an exemplary delay control circuit 400. The delay control circuit 400 comprises a first input 402 that receives a READ SYNC 2 output (such as READ SYNC 2 output on line 241 in FIGS. 2A, 2B). The delay control circuit 400 comprises a second input 404 that senses an ALIGNED WRITE DATA output (such as ALIGNED WRITE DATA output on line 254 in FIGS. 2A, 2B). The delay control circuit 400 comprises a delay control output on line 405 (such as the delay control output 246 in FIGS. 2A, 2B).

The delay control circuit 400 comprises a clock oscillator 406 that receives the READ SYNC 2 output at input 402 and that provides a CLOCK output on line 408. The clock oscillator has a frequency that is adjusted to track the current repetition rate of pulses on the READ SYNC 2 output. The frequency of the CLOCK output on line 408 is a multiple of the repetition rate. According to one aspect, the frequency of the CLOCK output on line 408 is at least 100 times the frequency of the repetition rate of the READ SYNC 2 pulses. According to another aspect, the clock oscillator 406 comprises a phase lock loop type of oscillator. The clock oscillator 406 serves as time base for counting time between a READ SYNC 2 pulse and an ALIGNED WRITE DATA pulse. According to another aspect, the adjustment of the clock frequency adjusts for small variations of time between bits of bit patterned media that occur depending on radius of a bit patterned media track from a central axis (such as central axis 109 in FIG. 1).

The delay control circuit 400 comprises a counter 410 that is clocked by the CLOCK output on line 408. The counter 410 counts CLOCK output pulses between a READ SYNC 2 pulse and an ALIGNED WRITE DATA pulse that are received by the counter 410. The counter 410 provides a counter output T1 on line 412.

The delay control circuit 400 comprises a T1 REFERENCE STANDARD source 414. The T1 REFERENCE STANDARD source 414 is a stored digital number that represents a nominal count expected of the counter 410 when the ALIGNED WRITE DATA PULSE is aligned, in other words, when a write head is accurately aligned with a bit as illustrated in FIG. 3. The T1 REFERENCE STANDARD source 414 provides the stored digital reference number on line 416.

The delay control circuit 400 comprises a subtractor 418. The subtractor 418 subtracts the digital reference number on line 416 from the counter output T1 on line 412 and provides a subtractor output on line 420. The subtractor output on line 420 is representative of whether a bit is arriving early, late or on time at a write head. When the subtractor output on line 420 is zero, then the write head is accurately aligned with a bit.

The delay control circuit 400 comprises an UP/DOWN counter 422 that is clocked up or down by the subtractor output on line 420. The UP/DOWN counter 422 provides an UP/DOWN counter output on bus 424.

The delay control circuit 400 comprises a digital to analog converter (DAC) 426 that provides the delay control output on line 405. The DAC 426 receives the UP/DOWN counter output on bus 424. According to one aspect, the delay control output on line 405 comprises a voltage that controls a bias voltage that biases a ferroelectric material in a delay line. According to another aspect, the UP/DOWN counter output on bus 424 is scaled to only partially correct for misalignment such that correction for misalignment is based on an average of multiple count cycles of the time counter 410.

The circuit 400 shown in FIG. 4 is exemplary, and other circuits can be used to provide the desired control of delay.

Figure 5:
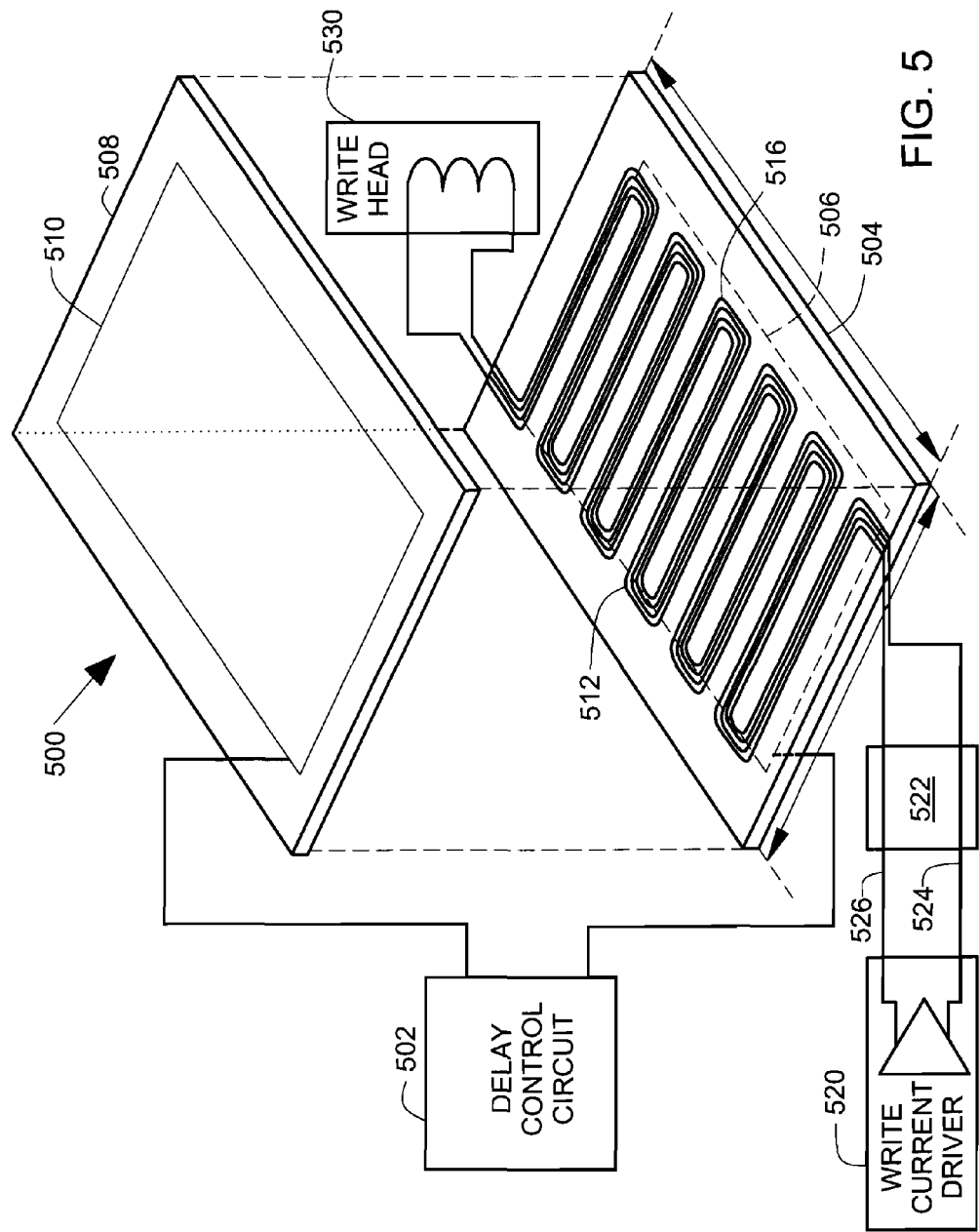
FIG. 5 illustrates an exploded view of an exemplary variable delay line.

FIG. 5 illustrates an exploded view of a variable delay line 500 that is connected to a delay control circuit 502. The variable delay line 500 comprises a first layer 504 of ferroelectric material. A first control electrode 506 is disposed on a lower side of the first layer 504. The first control electrode 506 is hidden from view in FIG. 5 and is indicated by a broken line.

The variable delay line 500 comprises a second layer 508 of ferroelectric material. A second control electrode 510 is disposed on an upper side of the second layer 508.

A first transmission line conductor line 512 is deposited on an upper side of the first layer 504. A second transmission line conductor 516 is deposited on an upper side of the first layer 504. The first transmission line conductor 512 and the second transmission line conductor 516 follow a serpentine path, as illustrated, and are generally parallel with one another along the serpentine path, also called a meander path. The first and second transmission line conductors 512, 516 are surrounded by ferroelectric material in the layers 504, 508. The ferroelectric material in the layers 504, 508 has a relative permittivity that is varied by a bias potential applied by the control electrodes 506, 510. The speed of propagation along the transmission line conductors 512, 516 is varied by the bias potential applied by the control electrodes 506, 510. The delay provided by the variable delay line 500 is thus varied by a delay control output from the delay control circuit 502. The control of the delay is closed loop control that controls the delay to provide alignment of a write head with a bit of bit patterned media. Noise in the system, in the form of variable delays from flexible circuits, is suppressed by the closed loop control.

As schematically illustrated, a write current driver 520 couples early write data along lines 524, 526, through flexible circuits 522 to an input of the transmission line conductors 512, 516. An output of the transmission line conductors 512, 516 couples aligned write data to a write coil in a write head 530. According to one aspect, an electrical impedance of the write head is relatively low. According to another aspect, an electric field produced by the transmission line conductors 512, 516 in the ferroelectric material between the transmission line conductors 512, 516 is low in comparison with an electric field produced by the control electrodes 506, 510 in the ferroelectric material between the transmission line conductors 512, 516. According to another aspect, control of the relative permittivity of the ferroelectric material between transmission line conductors 512, 516 is dominated by the delay control output. According to another aspect, impedance matching circuits (not illustrated) are included at the input of the transmission line, the output of the transmission line or both to reduce undesired reflections. According to another aspect, the delay provided along the transmission line conductors 512, 516 is substantially proportional to $\sqrt{\in\mid}$ where $\in\mid$ is the relative permittivity of the ferroelectric material. According to one aspect, the adjustable delay line 500 is an analog, linear delay line.

As delays through the flexible circuits 522 change as the read/write head is moving, a delay through the variable delay line 500 is adjusted by the delay control circuit to provide correct alignment of the aligned write data provided to the write head 530.

Figure 6:
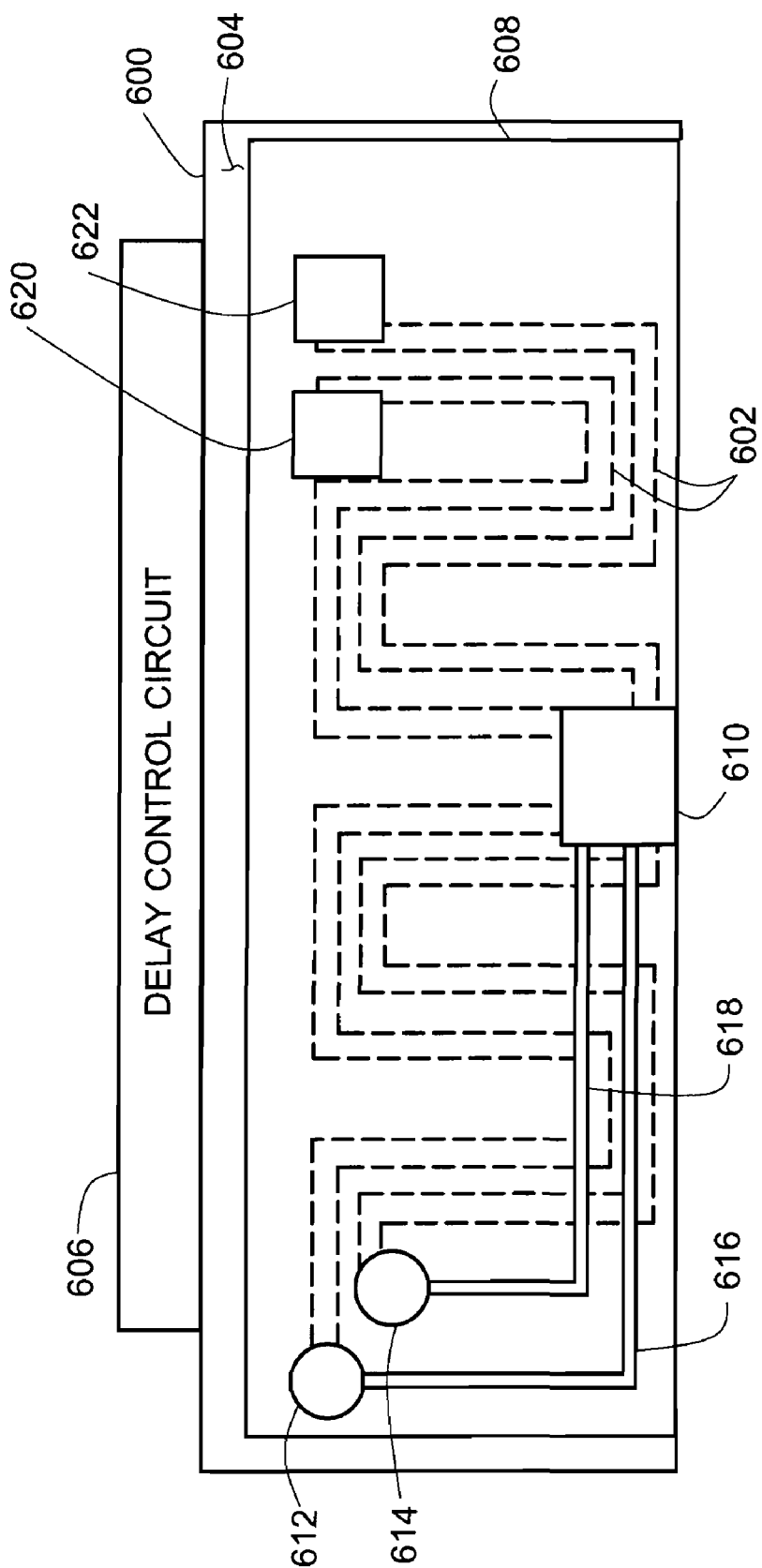
FIG. 6 illustrates a trailing edge view of an example of the disclosed apparatus on a slider.

FIG. 6 illustrates a trailing edge view of an apparatus (such as apparatus 225 in FIG. 2A) on a moving substrate or slider 600. A variable delay line 602 is disposed on a trailing edge surface 604. A delay control circuit 606 is disposed on a top surface of the slider 600. The variable delay line 602 is covered by a deposited layer 608 of electrically insulating material. A read/write head 610 overlies the variable delay line 602 on the trailing edge surface 604. The variable delay line 602 is disposed between the slider 600 and the read/write head 610. Vias 612, 614 and circuit traces 616, 618 are electrically conductive and connect an output of the variable delay line 602 to a write coil in the read/write head 610. Bonding pads 620, 622 provide connection points for connecting an input of the variable delay line 602 to early write data.

Figure 7:
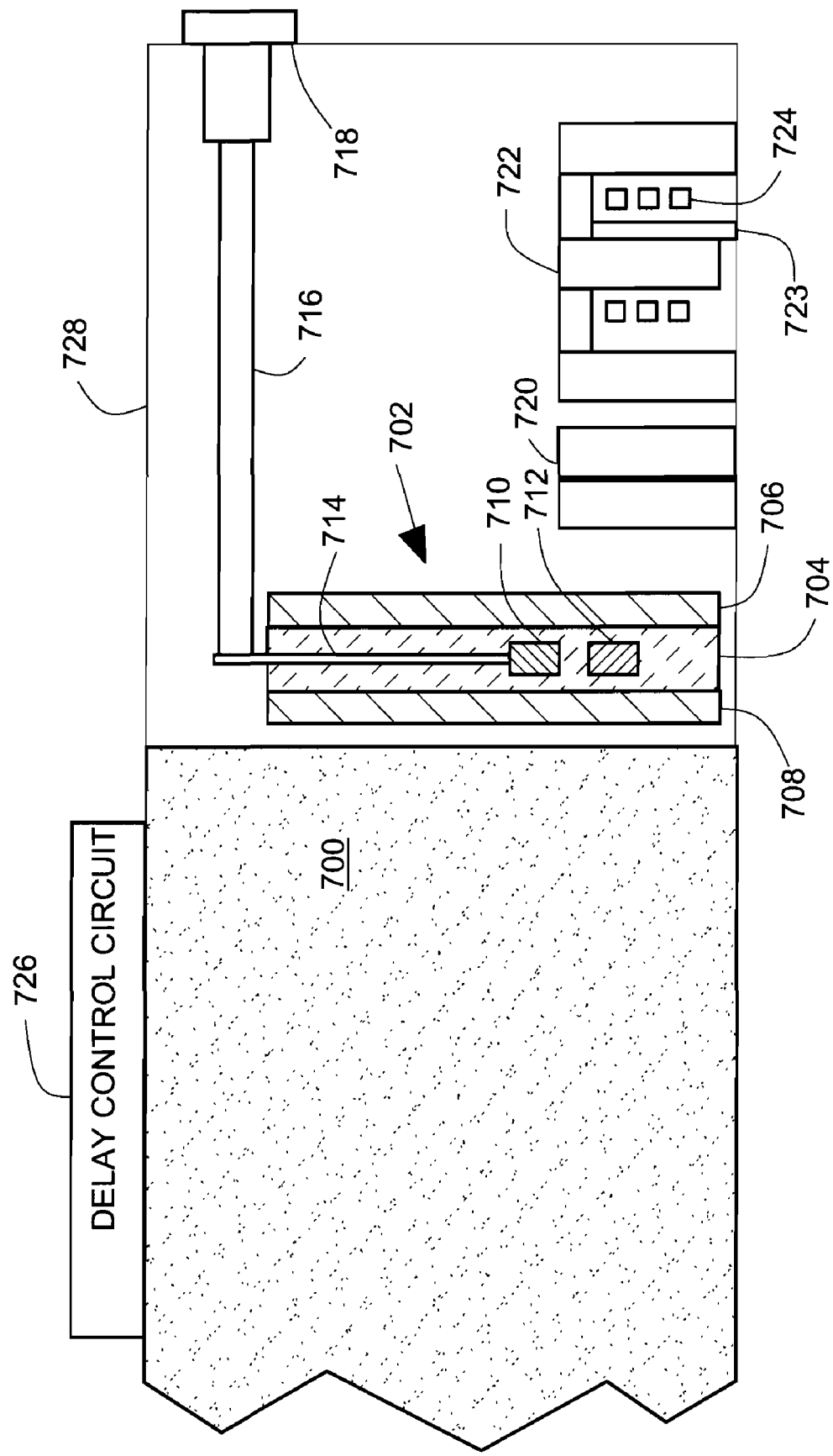
FIG. 7 illustrates a side cross sectional view of an example of the disclosed apparatus on a slider.

FIG. 7 illustrates a side cross sectional view of an apparatus on a slider 700. A variable delay line 702 is disposed on a trailing side of the slider 700. The variable delay line 700 comprises ferroelectric material layer 704, control electrodes 706, 708, and transmission line conductors 710, 712. A metallic layer 714 connects the transmission line conductor 710 to a via 716. The via 716 connects to a contact pad 718. A read head 720 and a write head 722 are disposed on a trailing side of the slider 700. The write head 722 comprises a write coil 724 and a pole tip 723 that aligns with a bit of bit patterned media. The read head 720 can comprise one or more magnetic readers or other read sensors. A delay control circuit 726 is disposed on a top side of the slider 700. The variable delay line 702 is situated near the slider 700 to permit high temperature ferroelectric material processing to be completed before other read/write head layers are deposited over the top of the variable delay line 702.

As described below in connection with FIGS. 8-13, simulations have been carried out on a meander delay line, to characterize the potential delay tunability from ferroelectric delay lines. The write signal is injected into the copper meander transmission lines, which are surrounded by ferroelectric material. The permittivity of the ferroelectric material is varied, to simulate the effect of applying a voltage bias across the ferroelectric material. The copper line thickness is one micrometer and the meander transmission lines are surrounded by a ferroelectric film thickness of 5 micrometers on either side of the meander lines. A trapezoidal current signal (e.g., a write current) of nominal amplitude is applied to the input of the delay line and the output of the delay line is monitored in time. The rise time of the input write current is 0.5 nanosecond.

Figure 8:
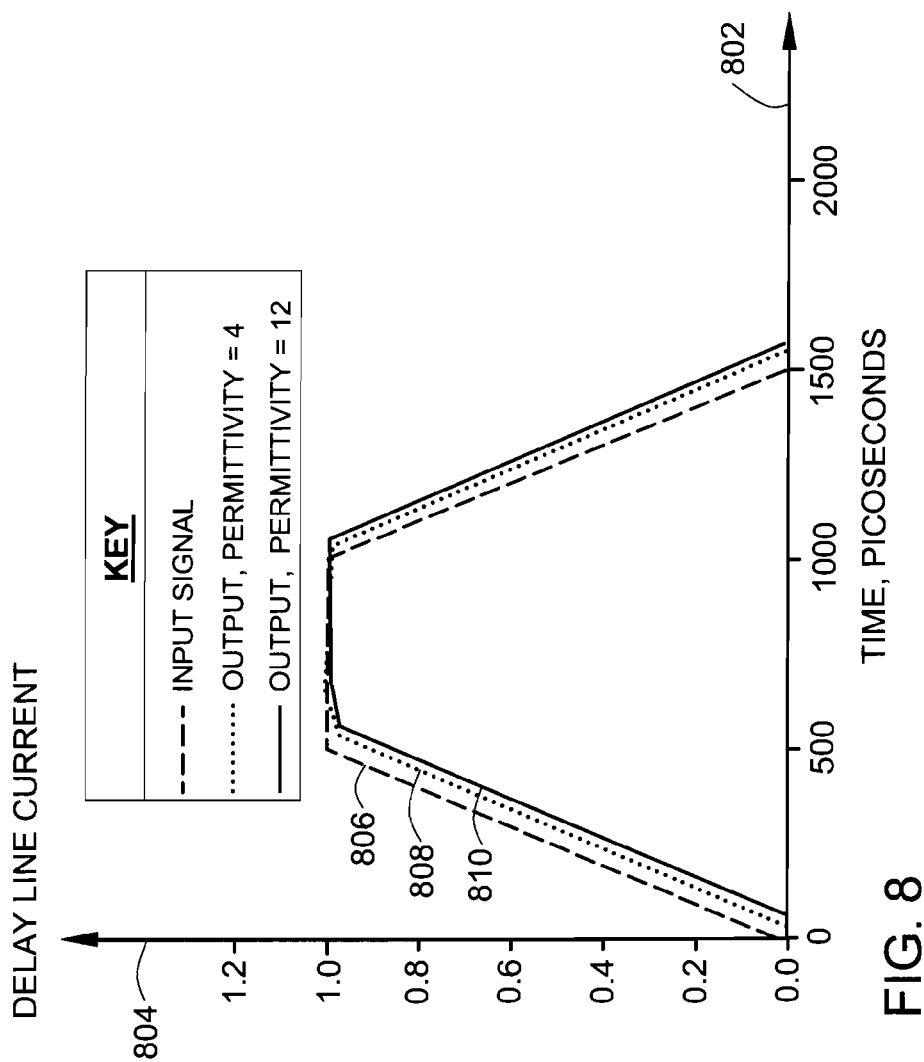
FIG. 8 illustrates variation of time delay in a ferroelectric delay line as a function of relative permittivity for a low permittivity ferroelectric material.

FIG. 8 illustrates variation of time delay in a ferroelectric delay line as a function of relative permittivity for a low permittivity ferroelectric material. A horizontal axis 802 represents time in picoseconds, and a vertical axis 804 represents delay line current. A first waveform 806 represents an input current at an input of the delay line. A second waveform 808 represents an output current at a delay line output when the relative permittivity of the ferroelectric material is set to 4 by a delay control output. A third waveform 810 represents an output current at the delay line output when the relative permittivity of the ferroelectric material is set to 12 by a delay control output. It can be seen by inspection of FIG. 8 that the delay through the delay line can be adjusted by adjusting relative permittivity by setting a delay control output voltage that is applied to the delay line.

Figure 9:
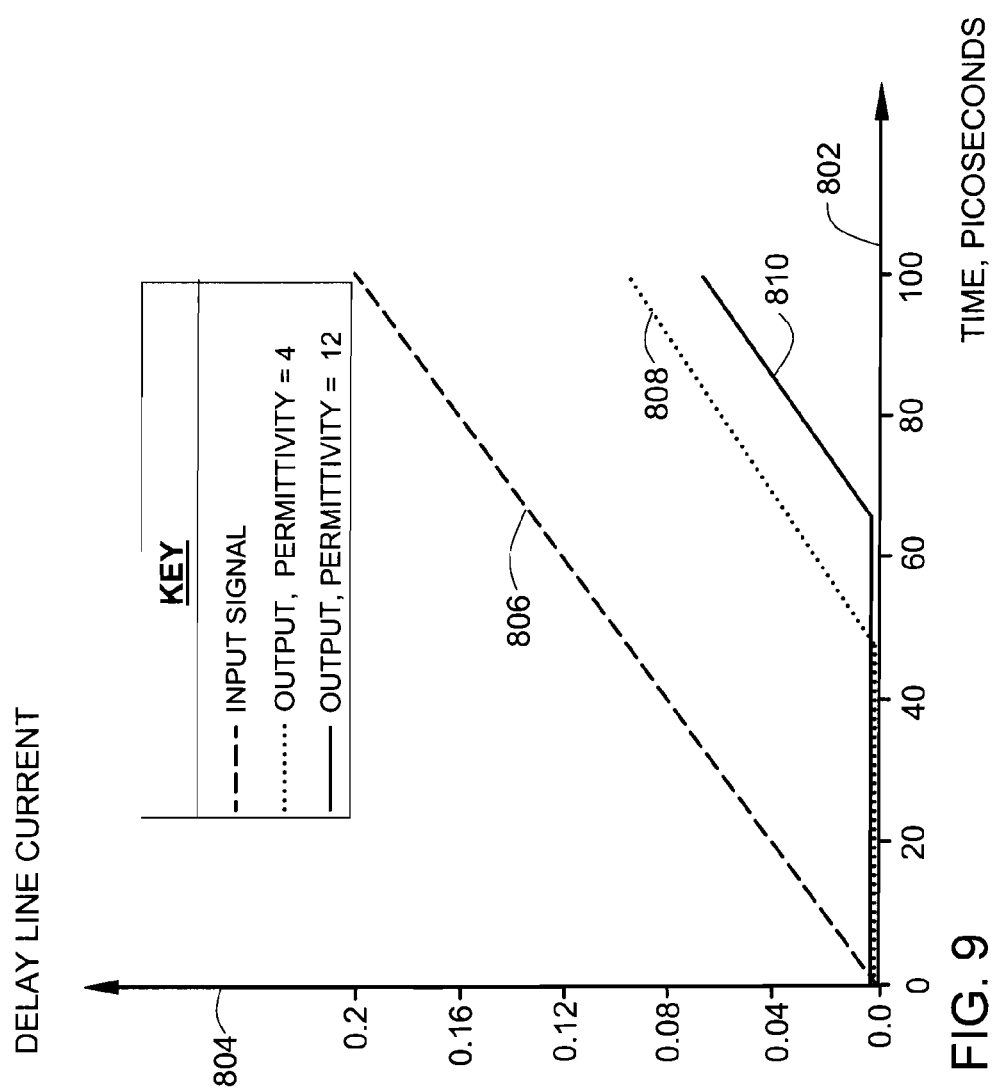
FIG. 9 illustrates an enlarged view of a portion of the data illustrated in FIG. 8.

FIG. 9 illustrates an enlarged view of the data illustrated in FIG. 8. The effect of varying the ferroelectric permittivity from 4 to 12 is more clearly seen in FIG. 9. The delay line current takes 48 picoseconds to travel from input to output when the relative permittivity is set to 4, while the delay time is 64 picoseconds when the relative permittivity is set to 12, corresponding to a delay time change of 16 picoseconds.

Figure 10:
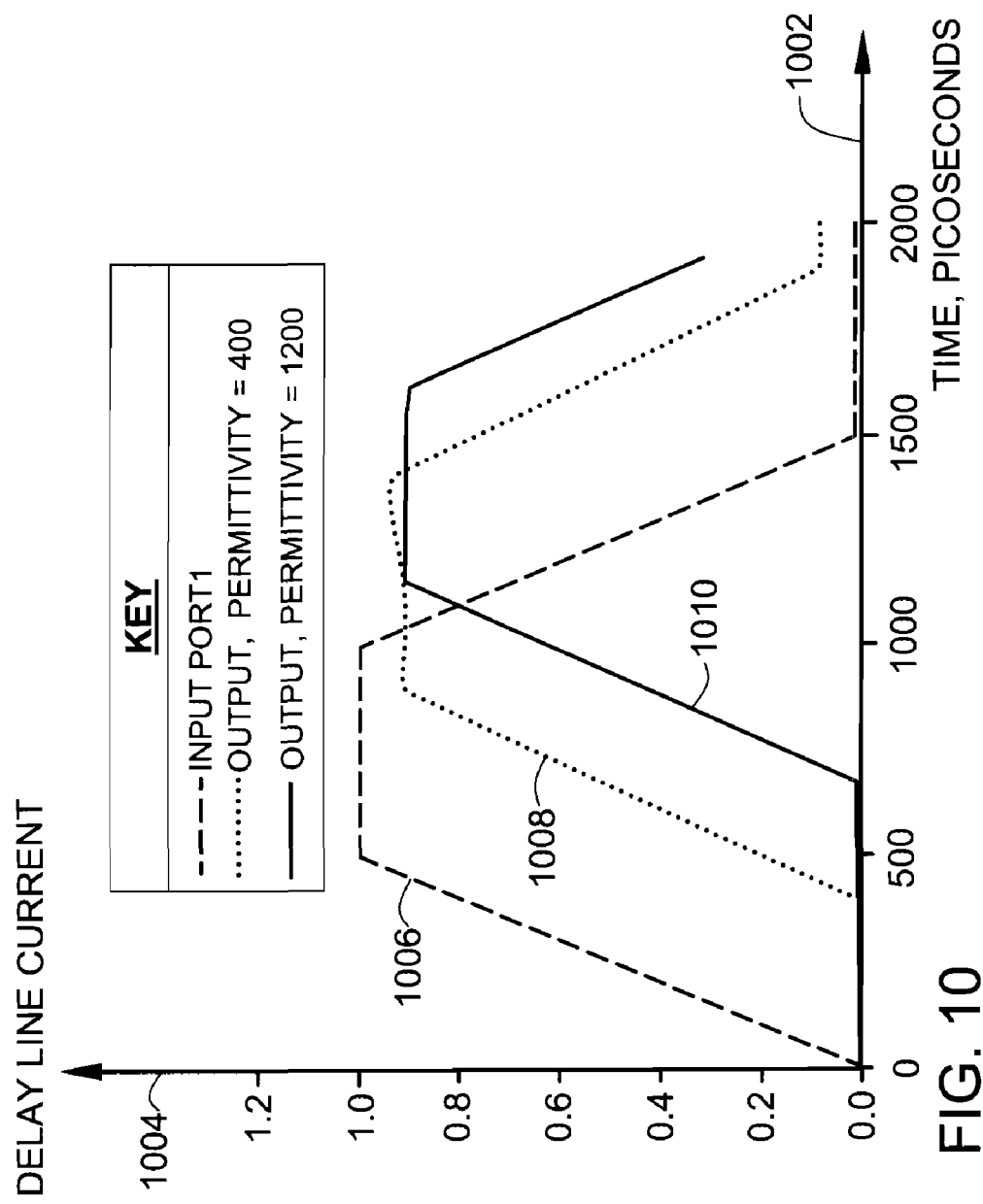
FIG. 10 illustrates variation of time delay in a ferroelectric delay line as a function of relative permittivity for a high permittivity ferroelectric material.

FIG. 10 illustrates variation of time delay in a ferroelectric delay line as a function of relative permittivity for a high permittivity ferroelectric material. A horizontal axis 1002 represents time in picoseconds, and a vertical axis 1004 represents delay line current. A first waveform 1006 represents an input current at an input of the delay line. A second waveform 1008 represents an output current at a delay line output when the relative permittivity of the ferroelectric material is set to 400 by a delay control output. A third waveform 1010 represents an output current at the delay line output when the relative permittivity of the ferroelectric material is set to 1200 by a delay control output. It can be seen by inspection of FIG. 10 that the delay through the delay line can be adjusted by adjusting relative permittivity by setting a delay control output voltage that is applied to the delay line.

Figure 11:
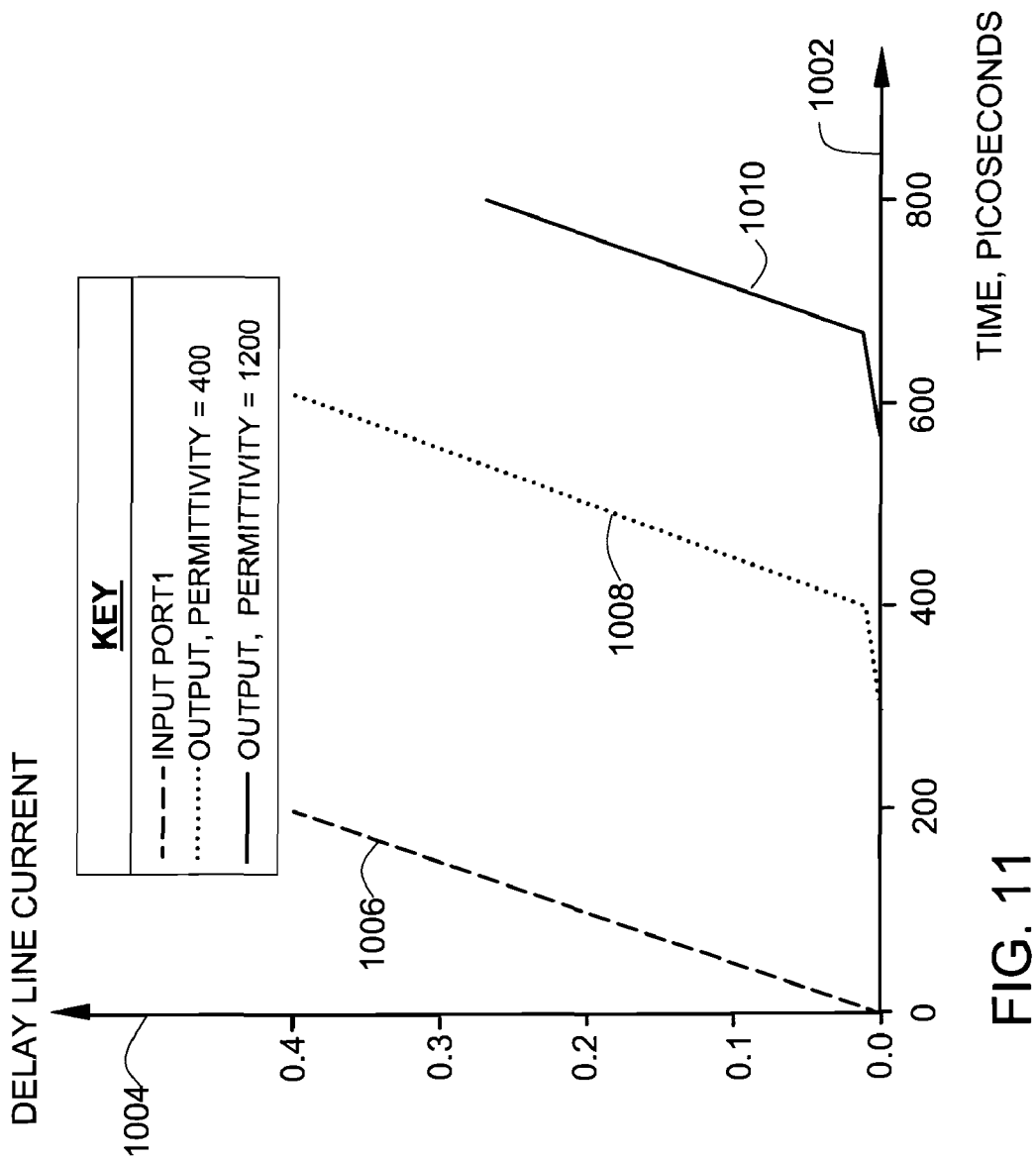
FIG. 11 illustrates an enlarged view of a portion of the data illustrated in FIG. 10.

FIG. 11 illustrates an enlarged view of the data illustrated in FIG. 10. The effect of varying the ferroelectric permittivity from 400 to 1200 is more clearly seen in FIG. 11. The delay line current takes 400 picoseconds to travel from input to output when the relative permittivity is set to 400, while the delay time is 665 picoseconds when the relative permittivity is set to 1200, corresponding to a delay time change of 265 picoseconds.

Figure 12:
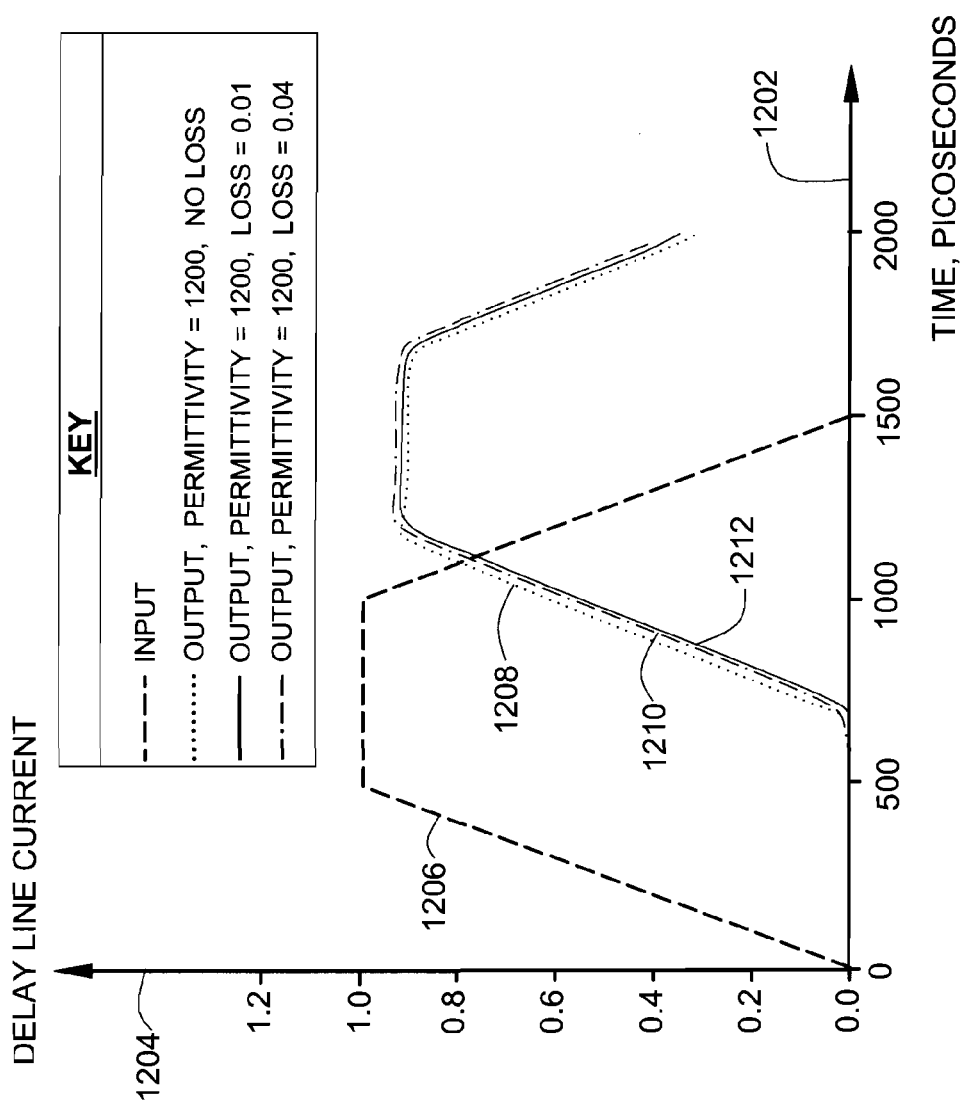
FIG. 12 illustrates variation of time delay in a ferroelectric delay line as a function of relative permittivity for a low permittivity ferroelectric material.
Figure 13:
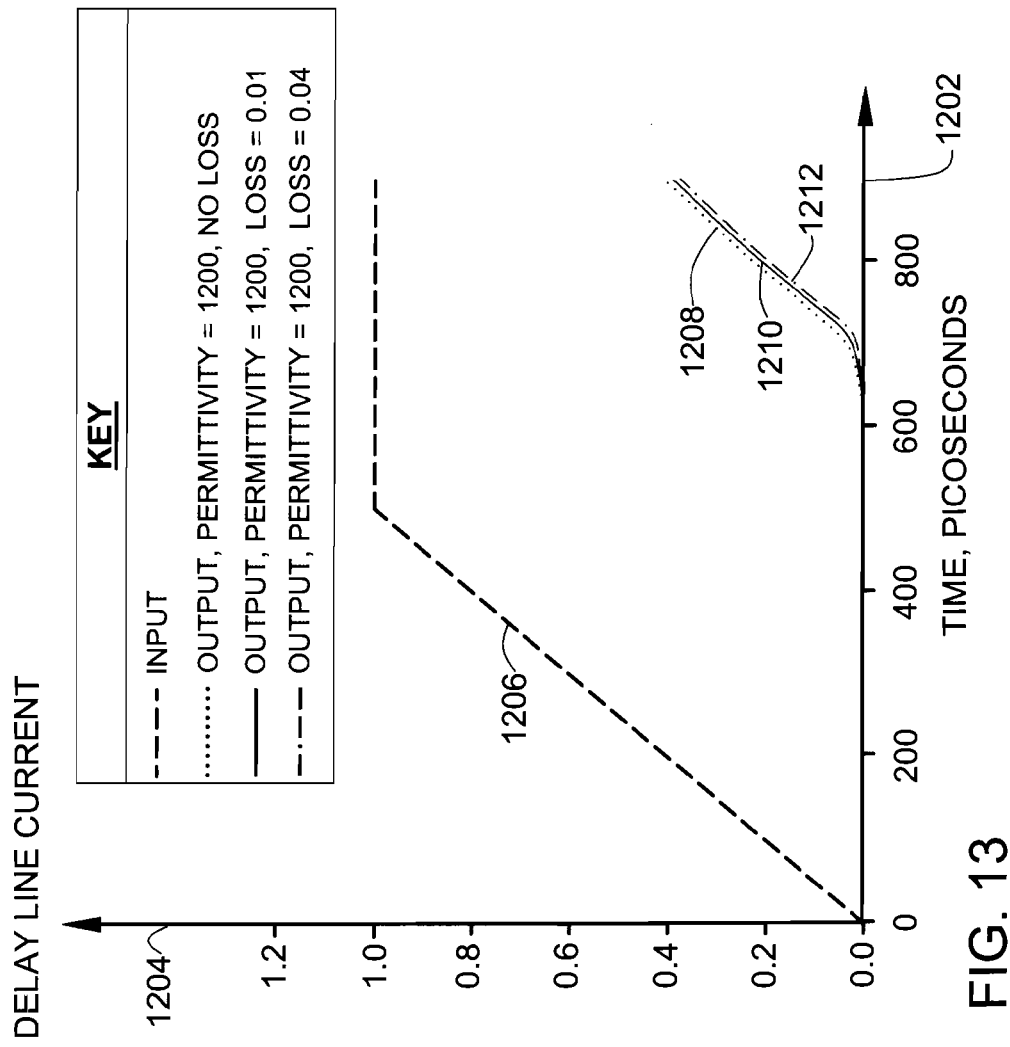
FIG. 13 illustrates an enlarged view of a portion of the data illustrated in FIG. 12.

FIGS. 12-13 illustrate time delay variation for a delay line with and without dielectric losses. Losses are an issue for ferroelectric materials, in microwave applications. The dielectric losses can be characterized by the loss tangent, which is the ratio between the complex (lossy) part of the permittivity and the real (in-phase) part of the permittivity. Increased loss tangents are observed for ferroelectric thin films as compared to bulk material. FIGS. 12-13 show simulated delay times for the meander delay line system for loss tangents of 0.01 and 0.04. These are typical values of loss tangent, which have been observed at microwave frequencies for BaSrTiO thin films. It can be seen that these loss levels have minimal impact on the output signal quality.

FIG. 12 illustrates variation of time delay in a ferroelectric delay line as a function of relative permittivity for a high permittivity ferroelectric material. A horizontal axis 1202 represents time in picoseconds, and a vertical axis 1204 represents delay line current. A first waveform 1206 represents an input current at an input of the delay line. A second waveform 1208 represents an output current at a delay line output when the loss tangent is zero. A third waveform 1210 represents an output current at the delay line output when the delay tangent is 0.01. A fourth waveform 1212 represents an output current at the delay line output when the delay tangent is 0.04. It can be seen by inspection of FIG. 12 that the delay through the delay line is not substantially affected by the loss tangent in the range of 0-0.04.

FIG. 13 illustrates an enlarged view of the data illustrated in FIG. 12. The minimal effect of the loss tangent is more clearly seen in FIG. 13.

It is to be understood that even though numerous characteristics and advantages of various aspects have been set forth in the foregoing description, together with details of the structure and function of aspects, this disclosure is illustrative only, and changes may be made in detail, especially in matters of structure and arrangement of parts within the principles disclosed to the full extent indicated by the broad general meaning of the terms in which the appended claims are expressed. For example, the particular elements may vary depending on the particular application for the data storage system while maintaining substantially the same functionality. In addition, although certain aspects described herein is directed to a disc drive system for data storage, it will be appreciated by those skilled in the art that the present teachings can be applied to other data storage devices, without departing from the scope of this disclosure.

What is claimed is:

1. An apparatus, comprising:
   a data access transducer disposed on a movable substrate;
   a control circuit disposed on the movable substrate; and
   an adjustable delay line disposed on the movable substrate and directly connected to the data access transducer, the adjustable delay line delaying transmission of aligned write data to the data access transducer by an adjustable delay that is controlled by the control circuit as a function of read synchronization data provided by the data access transducer.

2. The apparatus of claim 1 wherein the data access transducer comprises a read head and a write head, and the movable substrate comprises a slider.

3. The apparatus of claim 2 wherein the data access transducer is couplable to bit patterned magnetic media, and the control circuit controls the adjustable delay to align the aligned write data with bits in the bit patterned magnetic media.

4. The apparatus of claim 1 wherein the control circuit counts time between a pulse of read synchronization data and an aligned write data pulse.

5. The apparatus of claim 1 wherein the adjustable delay line comprises a thin film ferroelectric material with a permittivity adjusted by an adjusted bias voltage generated by the control circuit.

6. The apparatus of claim 5 wherein the adjustable delay line comprises electrodes that apply the adjusted bias voltage to the ferroelectric material.

7. The apparatus of claim 1 wherein the adjustable delay line comprises a serpentine delay line.

8. An apparatus, comprising:
a data writing transducer disposed on a movable substrate;
a data reading transducer disposed on the movable substrate and providing a read synchronization output;
a delay line disposed on the movable substrate, the delay line comprising a write data input, a delay time adjustment input, and a write data output that couples to the data writing transducer; and
a control circuit providing a delay control output that is a function of the read synchronization output and that is coupled to the delay time adjustment input.

9. The apparatus of claim 8 wherein the data writing transducer comprises a write head and the data reading transducer comprises a read head and the movable substrate comprises a slider.

10. The apparatus of claim 9 wherein the read head and write head are couplable to bit patterned magnetic media, and the control circuit controls the delay control output to align the write data output with bits in the bit patterned magnetic media.

11. The apparatus of claim 8 wherein the delay line comprises a ferroelectric material with a permittivity adjusted by application of an adjusted bias voltage.

12. The apparatus of claim 11 wherein the adjustable delay line comprises at least one electrode that applies the adjusted bias voltage to the ferroelectric material.

13. The apparatus of claim 8 wherein the control circuit counts a clock between a pulse of the read synchronization output and a pulse of the write data output.

14. The apparatus of claim 8 wherein the delay line comprises a serpentine delay line.

15. A data storage device, comprising:
a slider accessing bit patterned media;
read and write heads disposed on the slider; and
an adjustable delay line disposed on the slider and directly connected to the write head, the adjustable delay line providing aligned write data to the write head that is aligned with the bit patterned media.

16. The data storage device of claim 15, comprising:
a delay control circuit providing a delay control output to the adjustable delay line.

17. The data storage device of claim 16 wherein the read head provides a read synchronization output to the delay control circuit.

18. The data storage device of claim 16 wherein the delay control circuit senses the aligned write data.

19. The data storage device of claim 15 wherein the adjustable delay line receives early write data that is not aligned with the bit patterned media.

20. The data storage device of claim 15 and comprising a flexible circuit coupled between the slider and a host computer, and electrical signal connections between the delay control circuit, the read and write heads and the adjustable delay line do not pass through the flexible circuit.

21. An apparatus comprising:
an adjustable delay line disposed on a slider and directly connected to a write head on the slider, the adjustable delay line configured to align write data to the write head.

* * * * *